United States Patent [19]
Ejiri et al.

[11] Patent Number: 5,249,062
[45] Date of Patent: Sep. 28, 1993

[54] IMAGE COMMUNICATION USING INK JET RECORDER WITH HEAT FUSING DEVICE

[75] Inventors: Seishi Ejiri, Kawasaki; Yasuyuki Shinada, Yokohama, both of Japan

[73] Assignee: Canon Kabushiki Kaisha, Tokyo, Japan

[21] Appl. No.: 953,776

[22] Filed: Sep. 30, 1992

Related U.S. Application Data

[63] Continuation of Ser. No. 659,222, Feb. 22, 1991, abandoned.

[30] Foreign Application Priority Data

Feb. 23, 1990 [JP] Japan ................... 2-041059

[51] Int. Cl.⁵ ............... H04N 1/32; G03G 15/20
[52] U.S. Cl. ................... 358/296; 358/434; 358/435; 355/282
[58] Field of Search ............. 358/296, 434, 435, 438, 358/439; 355/282, 285; 346/25

[56] References Cited

U.S. PATENT DOCUMENTS

| | | | |
|---|---|---|---|
| 1,819,264 | 12/1928 | Ranger et al. | 355/282 |
| 2,454,247 | 11/1948 | Young . | |
| 4,313,124 | 1/1982 | Hara | 346/140 R |
| 4,333,088 | 6/1982 | Diggins | 346/140 R |
| 4,345,262 | 8/1982 | Shirato et al. | 346/140 R |
| 4,376,283 | 3/1983 | Bower | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,561,789 | 12/1985 | Saito | 400/120 |
| 4,609,278 | 9/1986 | Taniguchi | 355/285 X |
| 4,681,423 | 7/1987 | Nishijima | 355/285 |
| 4,723,129 | 2/1988 | Endo et al. | 346/1.1 |
| 4,740,796 | 4/1988 | Endo et al. | 346/1.1 |
| 4,760,462 | 7/1988 | Ogawa | 358/200 |
| 4,933,684 | 6/1990 | Tasaki et al. | 346/25 X |
| 4,951,096 | 8/1990 | Derimiggio et al. | 355/285 |
| 4,972,270 | 11/1990 | Kurtin et al. | 358/296 |
| 4,994,852 | 2/1991 | Matsuuchi et al. | 355/282 X |
| 4,999,716 | 3/1991 | Nakamura | 358/434 |

FOREIGN PATENT DOCUMENTS

| | | |
|---|---|---|
| 269585 | 6/1988 | European Pat. Off. . |
| 294793 | 12/1988 | European Pat. Off. . |
| 2717119 | 10/1978 | Fed. Rep. of Germany ........ 346/25 |
| 56-68061 | 6/1981 | Japan . |
| 56-151578 | 11/1981 | Japan . |
| 57-212866 | 12/1982 | Japan . |
| 59-123670 | 7/1984 | Japan . |
| 59-138461 | 8/1984 | Japan . |
| 1-272480 | 10/1989 | Japan . |

Primary Examiner—Benjamin R. Fuller
Assistant Examiner—Eric Frahn
Attorney, Agent, or Firm—Fitzpatrick, Cella, Harper & Scinto

[57] ABSTRACT

An image communication system equipped with an ink jet printer having multiple ink orifices permits excellent images without ink stains. The system includes a heat fusing device actuated in accordance with reception of a call signal, and image data is received after the temperature of the heat fusing device has reached to a predetermined temperature. If the predetermined temperature is not attained within a predetermined time, an error alarm is output.

11 Claims, 8 Drawing Sheets

IMAGE COMMUNICATION USING INK JET RECORDER WITH HEAT FUSING DEVICE

This application is a continuation of application Ser. No. 07/659,222 filed Feb. 22, 1991, now abandoned.

BACKGROUND OF THE INVENTION

1. Field of the Invention

The present invention relates to a facsimile system or other image communication system, or more particularly, to an image communication system equipped with an ink jet printer having multiple ink orifices.

2. Related Background Art

An ink jet printer has been developed recently, wherein bubbles generated with heat energy are utilized to discharge ink from orifices to a recorded material, and thus characters or images are recorded. In the printer, heat resistors (heaters) installed inside of the orifices are much smaller than piezoelectric elements used in a prior ink jet printer. Multiple orifices can be used in highly dense concentrations. This permits high-definition recording images and realizes high-speed and low-noise recording.

On the other hand, there is a demand for a facsimile system which can not only transmit images at high speed but also receive higher-definition images at high speed. Due to the above features, an ink jet printer which uses bubbles generated with heat energy to discharge ink to a recorded material would be one printer which can meet the demand.

This type of an ink jet printer discharges liquid ink with relatively low viscosity, fuses the ink droplets on a sheet, and thus records information. The ink must be well-fused on paper. However, ink cannot be fused onto paper naturally, and the sheet transport path is prolonged to ensure sufficient time for fusion. Otherwise, the printed portion may stain other portions of a sheet when they rubbed each other, which deteriorates image quality. The long fusing time becomes a serious obstacle in designing a more compact printer and allowing it to output multiple sheets at high speed. One countermeasure would be to apply heat or warm air to a printed sheet, thus facilitating fusion of ink. However, in realizing a facsimile system having a built-in ink jet printer, even if a fusing unit for applying heat to fuse ink is installed, it takes some time from when the fusing unit is energized until the temperature of the fusing unit rises to a proper given temperature. The time varies with the paper quality or the temperature of an ambient environment. If the fusing unit receives image data before the temperature reaches the given fusing temperature, ink stains may be created in a recorded portion.

SUMMARY OF THE INVENTION

The present invention attempts to solve the aforesaid problems. The main object is to provide an innovative image communication system.

Other object of the invention is to provide an image communication system which constantly permits excellent received images without any ink stain.

Other object of the invention is to provide an image communication system which does not cause a communication time to increase but permits received images which are excellently fused.

Other object of the invention is to provide an image communication system, which actuates a heat fusing means for using heat to fuse ink on a recorded material recorded by an ink jet recording apparatus, with reception of a call signal.

Other object of the invention is to provide an image communication system which receives image data after the temperature of a heat fusing means has reached a given temperature.

Other object of the invention is to provide an image communication system which releases a circuit and outputs an error alarm if the fusing temperature does not reach a given temperature when a certain time has elapsed after a heat fusing means is actuated, and thus prevents unnecessary data transmission and permits quick maintenance.

The other objects will be apparent in conjunction with the drawings and description below.

DETAILED DESCRIPTION OF PREFERRED EMBODIMENTS

Embodiments of the invention are detailed below in conjunction with the drawings.

Figure 1:
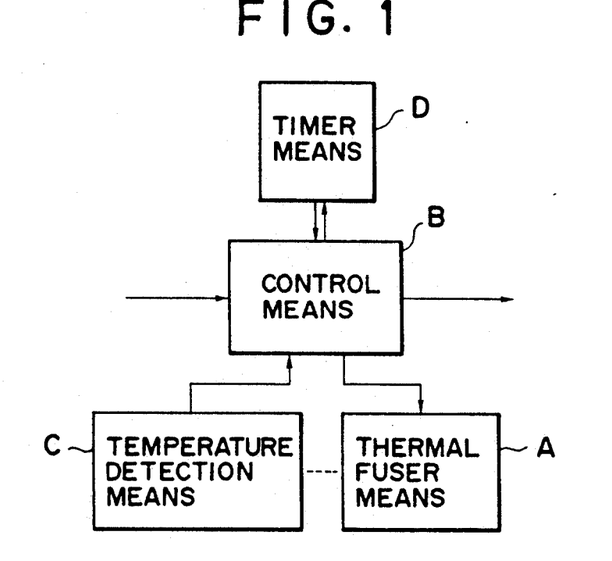
FIG. 1 is a block diagram showing the basic configuration of an embodiment of the invention.

FIG. 1 is a block diagram showing the basic concept for an embodiment of the invention. A represents a heat fusing means which is installed in a facsimile system including an ink jet recording apparatus as a recorder and which uses heat to fuse ink on a recorded material (generally, paper) recorded by the ink jet recording apparatus. B is a control means which actuates the heat fusing means A with reception of a call signal.

C is a temperature detecting means which detects the temperature of the heat fusing means A. D is a counting means which counts a given time when the heat fusing means is actuated.

The control means B starts receiving image data when the detected value of the temperature detecting means C has reached a given fusing temperature. If the detected value of the temperature detecting means C does not reach the given fusing temperature before the counting means D finishes counting a certain time, the control means B releases the circuit and outputs an error alarm.

Example of a configuration of a recorder (printer)

Figure 2:
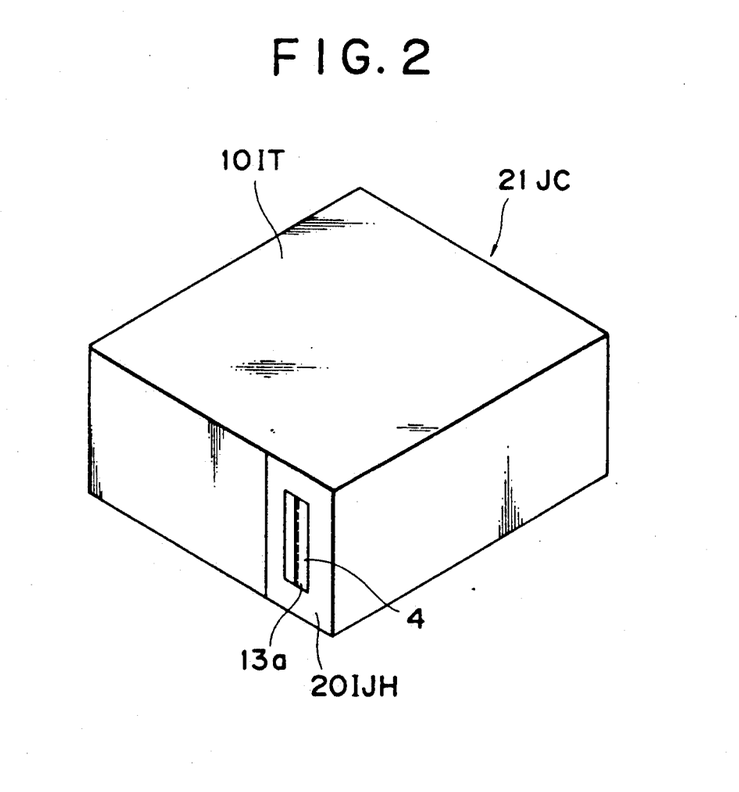
FIG. 2 is a perspective view showing an embodiment of an bubble-jet type ink jet cartridge to which the invention can apply.
Figure 3:
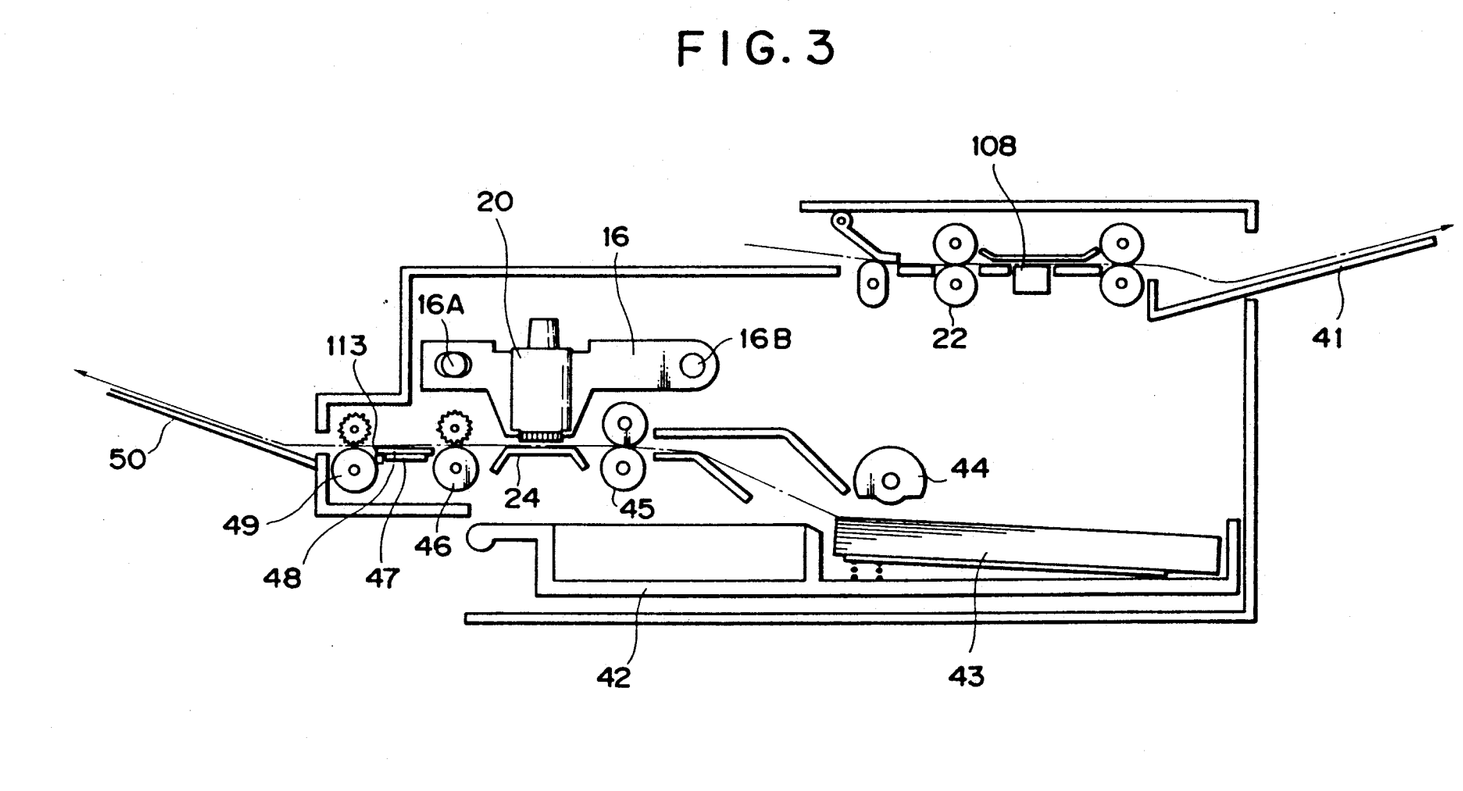
FIG. 3 shows a cross section of the internal configuration of a facsimile system embodying the invention.

FIG. 2 and 3 show an example of a configuration of an ink jet printer or an optimal recorder for a facsimile system in which the invention is implemented. In FIGS. 2 and 3, 20 is an ink jet head (recording head) which uses bubbles generated with heat energy to discharge ink onto a recording sheet. 21 is an ink jet cartridge (IJC) which is freely detachable and equipped with a tank 10IT which is united with the ink jet head (IJH) and supplies ink to the ink jet head (IJH).

In this embodiment, the ink jet cartridge 21 is shaped, as seen in the perspective view of FIG. 2, in such a way that the distal portion of the ink jet head 20 is slightly protruding from the front surface of the ink tank 10. The ink jet head cartridge 21 is fixed to a carriage placed on the main unit of the ink jet recording apparatus which will be described later. The disposable ink jet head cartridge 21 is detachable from the carriage.

The first ink tank 10 contains ink to be supplied to the ink jet head 20 and comprises an ink absorber, a container used to insert the ink absorber, and a cover member for sealing the container (not illustrated). The ink tank is filled with ink and supplies ink to the ink jet head when ink is discharged.

In this embodiment, a front plate 4 is made of a resin such as polysulfone, polyether sulfone, polyphenylene oxide and polypropylene, which are excellent in ink resistance.

The ink jet cartridge 21 having the aforesaid configuration is mounted on the carriage of the ink jet recording apparatus according to the procedure described below, and is freely detachable. With a given recording signal provided, the relative movements of the carriage and a recorded material are controlled to form a required recording image.

FIG. 3 shows a cross section of the mechanical configuration of a facsimile system related to an embodiment of the invention. 108 represents a close-contact image sensor, which reads an original transported to a given position by feed rollers 22, then converts the information into electric signals. The converted electric signals are processed and transmitted as described later. 41 is an original tray for storing originals.

42 represents a recording sheet cassette for storing recording sheets (43). The recording sheets are supplied one by one by a separation roller 44, then sent to a platen 24 or a recording position by feed rollers 45.

20 represents, as shown FIG. 2, an ink jet head (recording head) of an ink jet head cartridge IJC, which is equipped with a group of nozzles 13a which discharge ink from the opposite side of the recording face of a recording sheet fed onto the platen 24. 16 is a carriage for supporting the recording head 20. The driving force of a drive motor (not illustrated) is transmitted via a belt (not illustrated). Thereby, two guide shafts 16A and 16B which are set mutually in parallel can slide. Then, the recording head 20 reciprocates over the entire width of a recording sheet, discharges ink onto the recording sheet to produce an image corresponding to received image data.

At one end of the moving path of the recording head 20, or a position opposed to a home position, a head restoration unit (not illustrated) is installed. The head restoration unit is actuated to cap the recording head 20. According to the portion of the recording head 20 capped by the capping portion of the head restoration unit, an absorbing means incorporated in the head restoration unit (for example, an absorption pump) absorbs ink or a pressing means incorporated in the ink supply path supplies ink to the recording head 20 using pressure. Thus, ink is discharged forcibly from orifices so that ink with increased viscosity inside of the orifices can be removed. This restores discharge capacity. This discharge restoration is performed when the power supply is turned ON, the recording head is replaced, or a recording operation is not done for more than a given time. The capping operation performed at the end of recording protects the recording heads.

A recorded sheet which has undergone the aforesaid recording operation is sent by roller system 46 to a position of a fusing heat plate 48 whose temperature is raised to a given fusing temperature by a heating element (heater) 47, and applied ink is rapidly fused onto the sheet with heat of the fusing heat plate 48. The recording sheet which has undergone a fusing operation is discharged onto a discharge tray 50 by discharge roller 49. Needless to say, a fusing unit can be formed in the same manner even in a facsimile system using rolled paper. 113 is a sensor for detecting the temperature of the heat fusing plate 48.

Thus, a heat plate is used as a fusing unit instead of a roller. Therefore, a recording sheet which has not been fused can be fused in a non-contact state. This prevents distortion of a recording image or ink stains.

Example of a configuration of a controller

Figure 4:
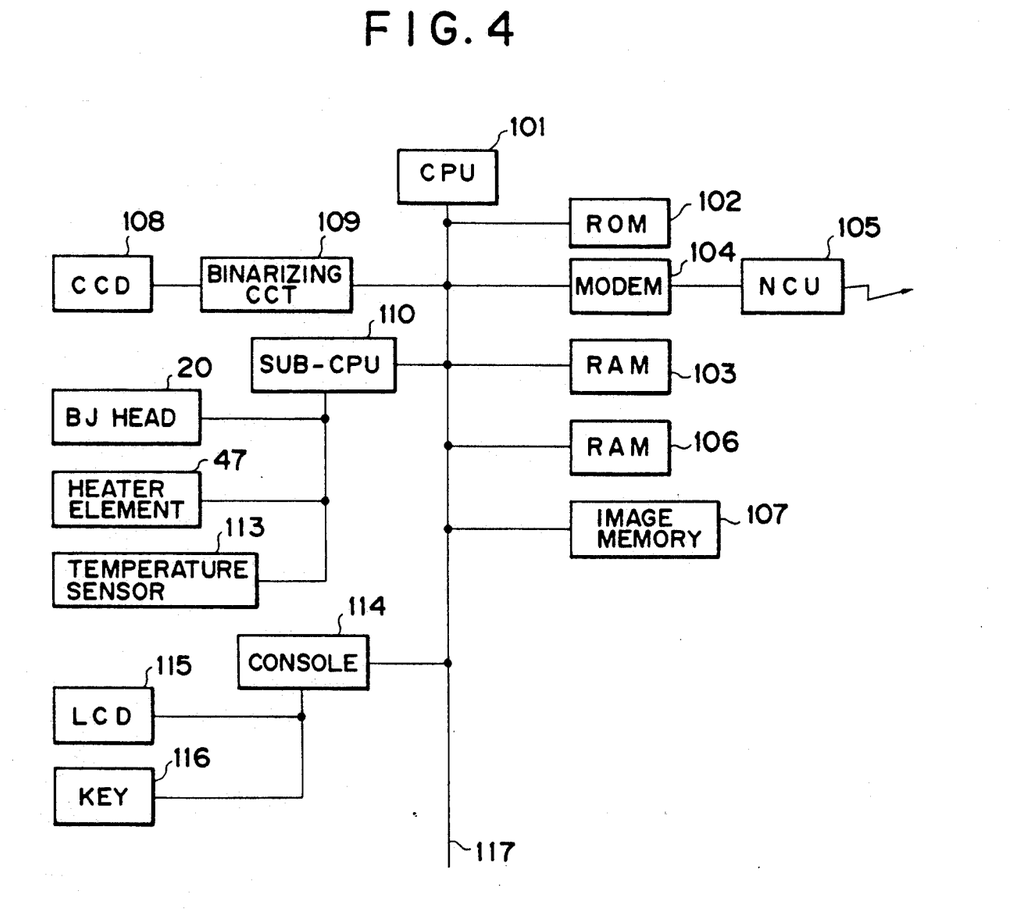
FIG. 4 is a block diagram showing an example of a circuit configuration for a facsimile system embodying the invention.
Figure 6:
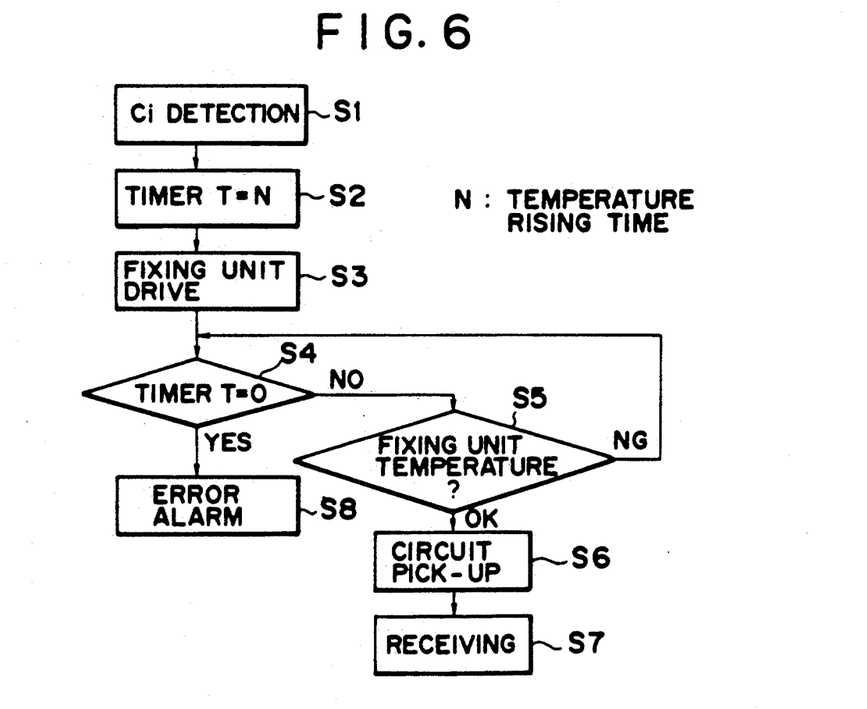
FIG. 6 is a flowchart showing the control operation for the first embodiment of the invention.
Figure 8:
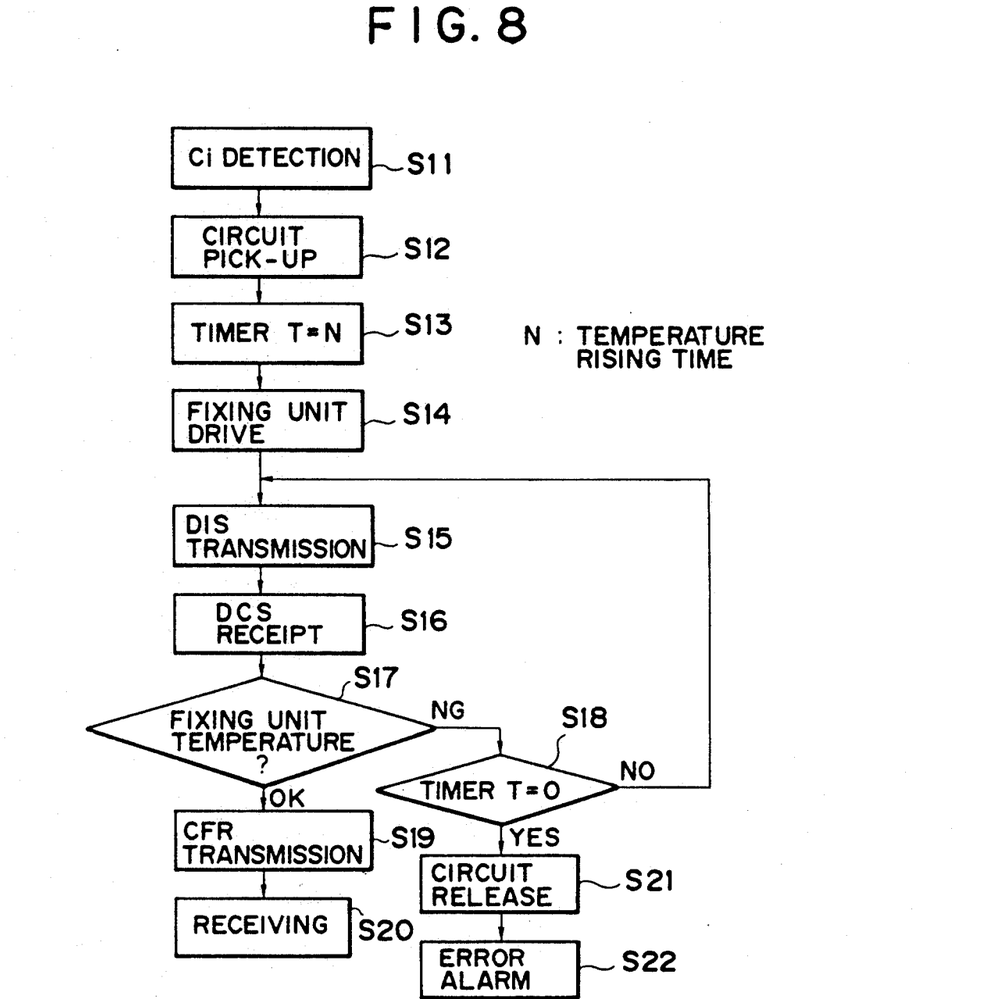
FIG. 8 is a flowchart showing the control operation of the second embodiment of the invention.

FIG. 4 shows an example of a circuit configuration for a facsimile system embodying the invention. In FIG. 4, 101 represents a main CPU or central processing unit including a microcomputer which controls the entire system to transmit or receive data via a bus 117. 102 is a read only memory (ROM) incorporated in the CPU 101 which contains the contents of various control procedures (programs) as shown in FIGS. 6 and 8. 103 is a work random access memory (RAM) the CPU 101 uses for jobs related to a counter or a register. 104 is a modulator-demodulator (modem) for data transmission, and 105, a network contol unit (NCU) to be connected to the modem 104. 106 is a registration RAM to be connected to a public telephone line via the NCU 104, wherein telephone numbers and abbreviations are registered. 107 is an image RAM (DRAM) which temporarily stores image data.

108 is a charge coupled device (CCD) serving as an imaging means in an original reader, which converts an original image formed through a rod lens or other image formation lens into electric signals. 109 is a binary coding circuit which binary-codes output signals of the CCD 108.

20 is a recording head in a recorder. An ink jet recording apparatus of the type shown in FIGS. 2 and 3 is used as the recorder in this embodiment. 110 is a sub CPU which controls a bubble jet head (BJ head) 20 in the recorder, a heating element 47, drive motors 17 to 22, and a temperature sensor 113 according to a control signal sent from the CPU 101. The sub CPU 110 incorporates a ROM which contains control programs for image recording.

114 is a console having a keyboard. On the operator panel, a liquid crystal display (LCD) 115 and various keys 116 are arranged.

Control operation in the first embodiment

Figure 5:
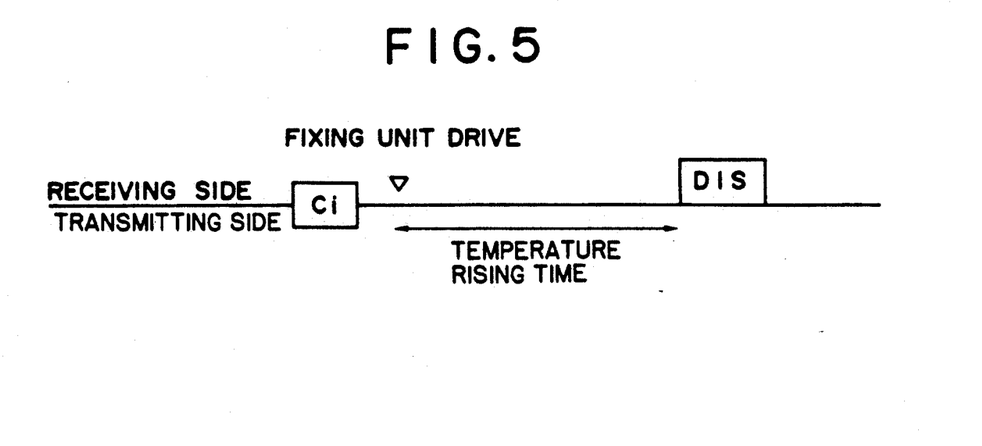
FIG. 5 is a timing chart showing the operation timing for the first embodiment of the invention.

Next, the control operation in the first embodiment of the invention is described using the timing chart of FIG. 5 and the flowchart of FIG. 6.

In this embodiment, as shown in FIG. 6, when reception of a call signal (Ci signal of 16 Hz) is detected, a given control signal is transmitted to CPU 110 so as to actuate a heating element 47 of a fusing unit (to start energizing and heating the element). A response signal or a digital identification (DIS) signal which serves to transmit the functions of the local system to a remote system is not transmitted until a signal indicating that the temperature of the fusing heat plate 48 in the fusing unit has reached a given fusing temperature, is generated by the CPU 110.

The embodiment is further detailed below. As shown in FIG. 6, when a Ci signal is detected (step S1), an internal timer T is set to a given permissible temperature rising time N (for example; 10 to 15 seconds). The internal timer T starts immediately counting the time in decrements (step S2). Meanwhile, a heating element 47 in a fusing unit (step S3) is energized.

If the detected value of a temperature sensor 113 provided to a fusing heat plate 48 in the fusing unit reaches a given fusing temperature (step S5) before the timer T value comes to 0 (step S4), a circuit is picked up to transmit a DIS signal, and a normal receive operation starts (steps S6 and S7). This enables reception and recording of image data.

On the other hand, if the timer T value comes to 0 before the detected value of the temperature sensor 113 has reached the given fusing temperature (step S4), it is recognized as a fusing unit failure. An error alarm indicating that an error has occurred in the fusing unit is output to a display 115 on a console 114. At the same time, the circuit is released to suspend the receive operation (step S8). At this time, it would be preferred that a buzzer sounds an alarm or that a receiving side transmits a signal indicating the occurrence of an error to a transmitting side. Alternatively, a given lamp may blink instead of displaying an error message.

According to this embodiment, the rising time for a heat fusing unit can be ensured. At the start of printing, the temperature of the heat fusing unit has already risen to a sufficient temperature for fusing. This eliminates ink stains due to fusing failure. In addition, an error in the fusing unit can be positively detected.

When determining an N value to be set in the timer T at the step S2, consideration must be taken of the time for defining a DIS signal, the time permitted for an error check when Paper Out is detected, and the time required for raising a low temperature in winter.

Control operation of the second embodiment

Figures 7A, 7B:
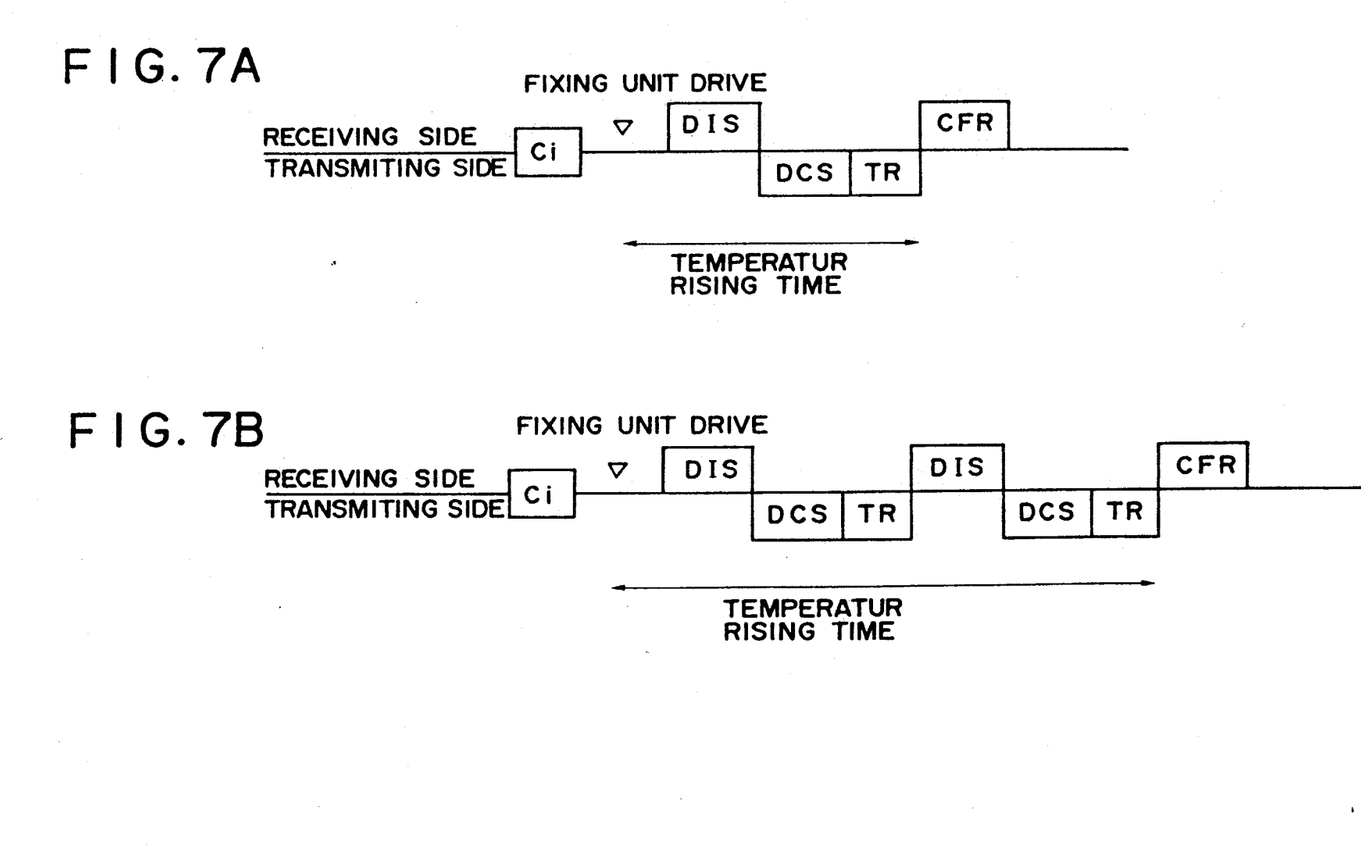
FIG. 7A and 7B are timing charts showing the operation timings for the second embodiment of the invention.

FIGS. 7A and 7B show the control operation of the second embodiment of the invention.

In this embodiment, as shown in the timing charts of FIGS. 7A and 7B, a fusing unit is actuated with detection of an automatically-received call signal (Ci signal of 16 Hz) in the same manner as that for the first embodiment. A DIS signal or a response signal (which selects a communicative mode based on the contents of DIS and instructs reception) is transmitted according to a digital instruction (DCS) signal even while the temperature of the fusing unit is rising. When the proper temperature is reached, a reception ready verification (CFR) signal is transmitted to start a normal receive operation. TR represents a training signal to be trasmitted from a transmitting side after the DCS signal. FIG. 7A is a timing chart for a short rising time in summer, and FIG. 7B, that for a long rising time in winter.

This embodiment is further detailed below. As shown in the flowchart of FIG. 8, when a Ci signal is detected, a circuit is picked up (steps S11 and S12) and an internal timer T is set to a given permissible temperature rising time N. Then, the internal timer T starts counting in decrements (step S13). Meanwhile, a heating element 47 in the fusing unit is actuated (step S14).

Next, a DIS signal is transmitted (step S15). With a DCS signal received (step S16), it is checked if the detected value of a temperature sensor in the fusing unit has reached a given fusing temperature (step S17). If the given fusing temperature has not been attained, it is checked if the timer T value comes to 0 (step S18). If the decision is made in the negative, control is returned to the step S15 and the operation is repeated.

After that, if the temperature of a fusing heat plate 48 in the fusing unit has reached the given temperature (step S17) before the timer T value comes to 0, a CFR signal indicating that image signal reception is ready, is transmitted (step S19) to start a normal receive operation (step S20). This enables reception and recording of image data.

On the other hand, if the timer T value comes to 0 before the detected value of the temperature sensor 113 has reached the given fusing temperature (step S18), the circuit is released (step S21) and an error alarm signal indicating that an error has occurred in the fusing unit is output to a display 115 on a console 114 (step S22). At this time, in the same way as that for the first embodiment, it is preferable that a buzzer sounds an alarm or that a receiving side transmits a signal indicating the occurrence of an error to a transmitting side.

The second embodiment ensures an extra time, because the temperature of a fusing unit need not be raised until an image signal reaches the receiving unit.

A heat fusing unit may be actuated with reception of a Ci signal, and the receive operation may be started in a sufficient given time. Thereby, the objects of the invention will be achieved. However, in this case, the receive operation start time may be delayed unnecessarily. This is not preferable from the viewpoint of a quick reception. If the heat fusing unit malfunctions, a recording failure may occur.

Other embodiments

Figure 9:
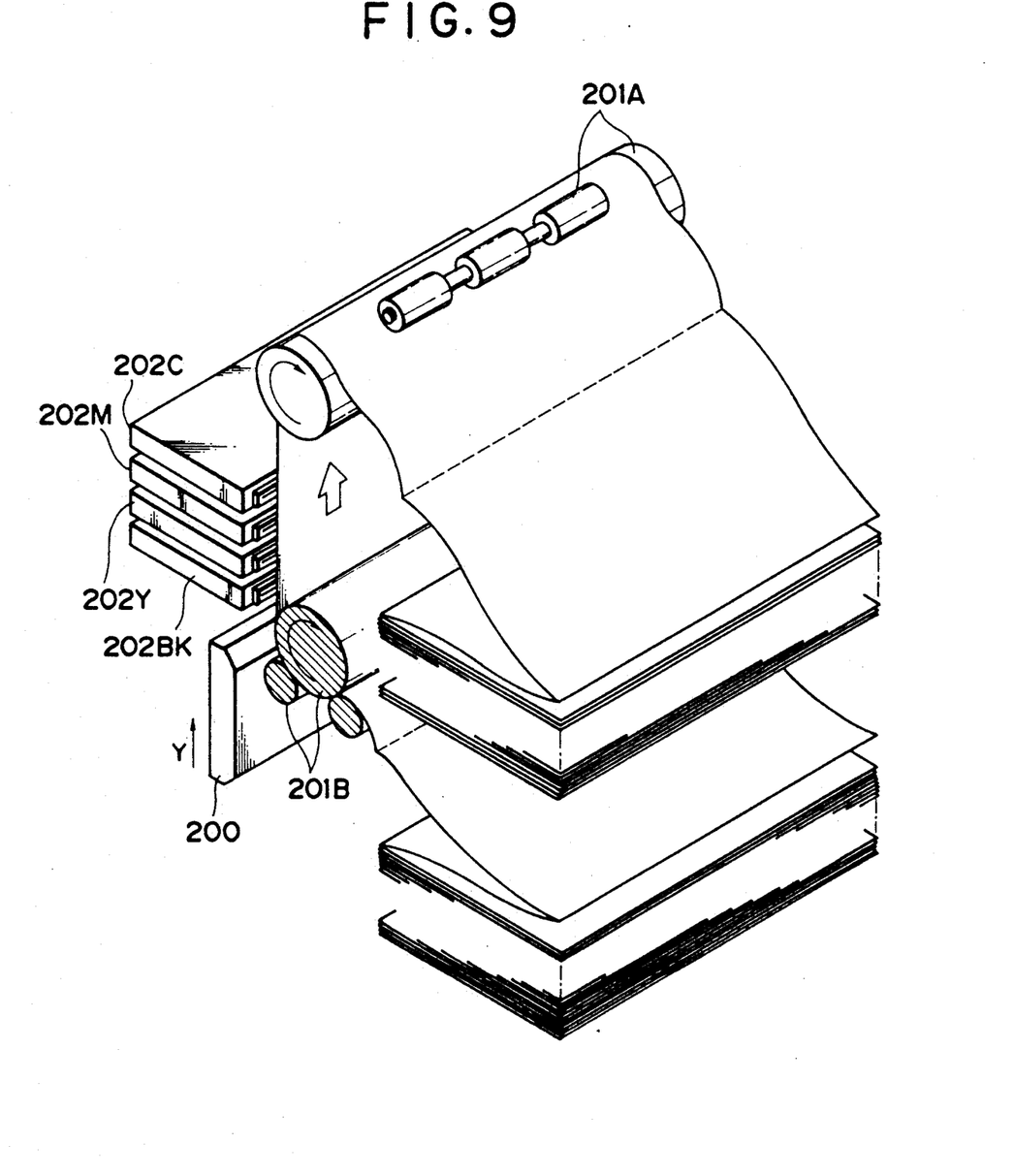
FIG. 9 is a perspective view of the schematic configuration of a full-length type ink jet recording apparatus for other embodiment of the invention.
Figure 10:
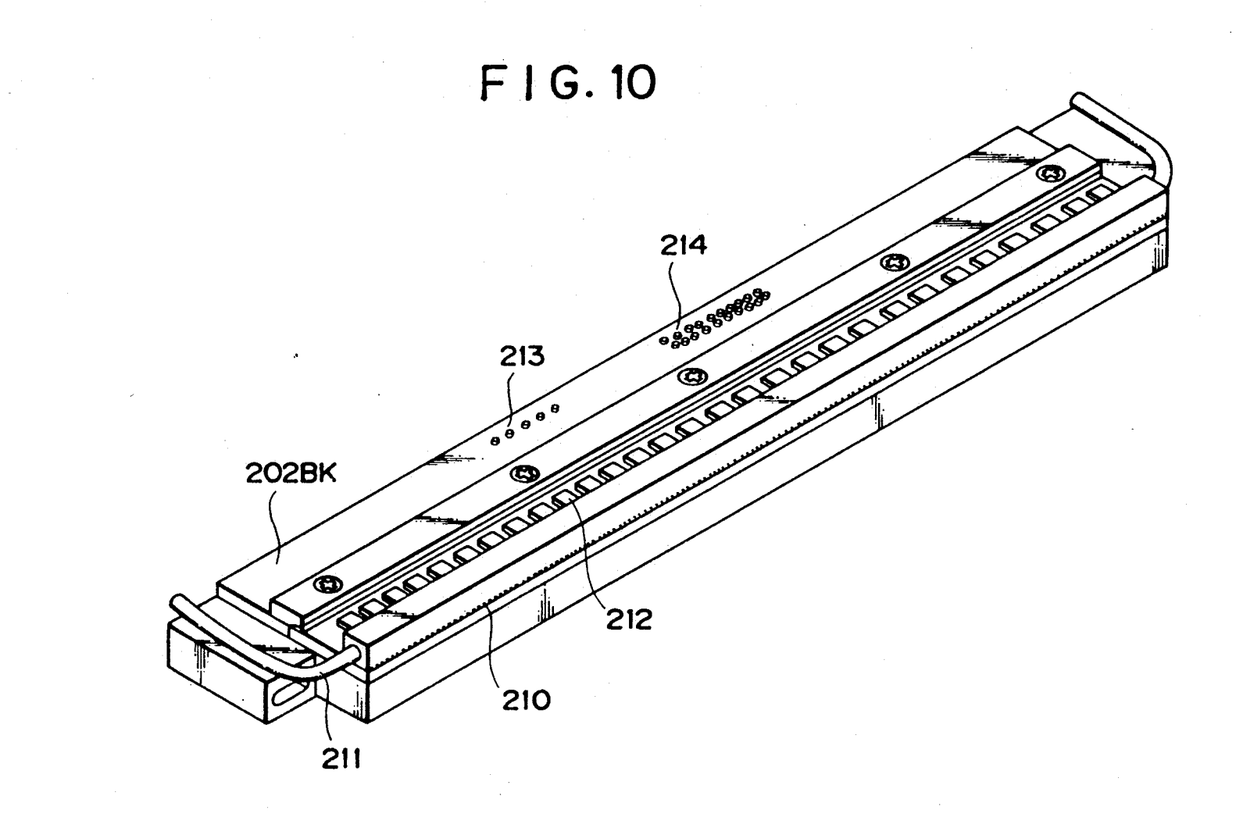
FIG. 10 is a perspective view of the recording head in FIG. 9.

The present invention is applicable not only to a serial printer mentioned above but also to a facsimile system equipped with an ink jet recording apparatus having a full-length type recording head which has a width equivalent to that of a maximum recording medium on which a recording unit can record data as shown in FIGS. 9 and 10.

In FIG. 9, 201A and 201B are a pair of rollers installed for carrying a recording medium R in arrow-marked sub-scanning direction Y. 202BK, 202Y, 202M, and 202C are fully multipurpose type recording heads for recording the colors of black, yellow, magenta, and cyan, whose nozzles are arranged over the whole width of the recording medium. The recording heads 202BK, 202Y, 202M, and 202C are arranged in that order from the upstream in recording medium transporting direction.

200 is a restoration mechanism, which substitutes for the recording medium and is opposed to the recording heads 202BK to 202C during restoration of ink discharge (a discharge restore operation). In this embodiment, preheating is done at a proper timing, and thereby the number of discharge restore operations can be diminished remarkably.

FIGS. 9 and 10 show an appearance of the recording heads 202BK to 202C. In FIG. 10, 210 represents ink orifices, and 211 an ink supply tube. 212 represents multiple IC circuits (drive circuits) for driving electric heat conversion elements. 213 and 214 are terminals.

Even when the invention is applied to a facsimile system having the foregoing full length type printer, the control procedures shown in FIGS. 6 and 8 can be adopted.

The invention is also applicable to a facsimile system having a recorder of a piezoelectric type ink jet recording apparatus which uses a piezoelectric element as an ink discharge energy source.

The present invention brings about excellent effects when implemented in a recording head or recording apparatus, and especially in a bubble jet method. The bubble jet method permits high-density and high-definition recording.

As for typical configurations and principles, the fundamental principles disclosed, for instance, in the specifications of U.S. Pat. Nos. 4,723,629 and 4,740,796 may be preferred. This method is applicable to both the on-demand and continuous type systems. In particular, for the on-demand type system, at least one drive signal which causes a rapid temperature rise exceeding nucleated boiling in accordance with recording information is applied to electric heat conversion elements arranged on the opposite side of a sheet or liquid path retaining liquid ink. Thereby, the electric heat conversion elements generate heat energy. Then, a heat action surface of a recording head causes film boiling. As a result, bubbles are created in liquid ink in one-to-one correspondence with the drive signals. With the growth and contraction of the bubbles, liquid ink is discharged via discharge orifices and at least one droplet is formed. Assuming that the drive signal has a pulse waveform, the bubbles grow and contract at regular intervals. Liquid ink can be discharged precisely in response to the drive signal. For this purpose, the drive signal of a pulse waveform described in the specification of U.S. Pat. Nos. 4,463,359 and 4,345,262 would be suitable. If the conditions in the specification of U.S. Pat. No. 4,313,124 related to the temperature rise rate of the thermal action surface are met, more excellent recording can be done.

As for the configuration of the recording head, orifices, a liquid path, and electric heat conversion elements (with a linear liquid path or perpendicular liquid path) may be combined as disclosed in the aforesaid specifications. In addition, the configuration disclosed in U.S. Pat. No. 4,558,333 in which a thermal action unit is arranged in a bent area, or in U.S. Pat. No. 4,459,600 is included in the invention. Furthermore, the invention will prove effective when implemented with the configuration disclosed in Japanese Patent Application Laid-open No. 59-124670 in which a shared slit is arranged as an orifice for multiple electric heat conversion elements, or that disclosed in Japanese Patent Application Laid-open No. 59-138461 in which an orifice for absorbing pressure waves of heat energy is opposed to a discharge unit. That is to say, the recording head can assume any shape.

As described previously, the invention is applicable to a full-length type recording head having a length covering the maximum width of a recording medium on which a recording unit can record data.

Such a recording head may have a configuration in which multiple recording heads are combined to cover the length or multiple recording heads are united as a single recording head. Moreover, the invention will prove effective when implemented in a chip type recording head, among the aforesaid serial type recording heads, which can be electrically connected to the main unit of a system and supplied with ink from the main unit when the recording head is mounted to the main unit of the system, and which is freely exchangeable. Using a recording head of a united cartridge type, the invention will also prove effective.

If a restoration means for a recording head and an auxiliary support means are included in a recording unit of the invention, the effects of the invention will be further enhanced. Specifically, the combination of a capping means or a cleaning means for a recording head, a pressing or absorbing means, electric heat conversion elements, other heating elements, or an auxiliary heating means or a combination of the electric heat conversion elements and other heating elements, or an auxiliary discharge mode in which ink is discharged for purposes other than recording will contribute to more stable recording.

As for the type of a recording head to be mounted and the number of recording heads, only one recording head may be installed for a single-color ink, or multiple recording heads may be provided in correspondence with multiple types of ink whose colors and densities are different.

As described above, since a heat fusing means for fusing ink is actuated with reception of a call signal, the time for raising the temperature of the heat fusing means before the start of printing can be ensured. Thus, a facsimile system or other image communication system which permits received images without ink stains can be provided. In this invention, a receiving operation of image data is started after it is confirmed that the temperature of the heat fusing means has reached a given fusing temperature. Therefore, the temperature of the heat fusing means has already risen to a sufficient temperature for fusing at the start of printing. This guarantees high-quality image recording without fusing failures.

What is claimed is:

1. An image communication system in which an image is recorded using a recording head which ejects ink by utilizing energy generated from discharge energy generating elements, the system comprising:
communication means for communicating with another image communication system to receive image data therefrom;
drive means for driving said recording head to eject ink onto a recording material in accordance with the image data received by said communication means;
heat fusing means for fusing the ink ejected onto the recording material by said recording head;
heat control means for actuating said heat fusing means in response to a call signal associated with the transmission of image data from the other image communication system; and
communication control means for causing said communication means to transmit a predetermined procedure signal to the other image communication system when a temperature of said heat fusing means reaches a predetermined temperature within a predetermined time after actuation thereof.

2. An image communication system according to any one of claims 1; wherein said discharge energy generating elements generate heat energy to cause ink to change state and be ejected from orifices.

3. An image communication system according to claim 1, wherein the predetermined procedure signal indicates to the other image communication system to begin image data transmission.

4. An image communication system according to claim 1, wherein said communication control means releases a communication line to the other image communication system when the temperature of said heat fusing means does not reach the predetermined temperature within the predetermined time.

5. An image communication system according to claim 4, wherein said communication control means outputs an error alarm when the communication line is released.

6. An image communication system in which an image is recorded using a recording head which ejects ink by utilizing energy generated from discharge energy generating elements, the system comprising:

communication means for communicating with another image communication system to receive image data therefrom;

drive means for driving said recording head to eject ink onto a recording material in accordance with the image data received by said communication means;

heat fusing means for fusing the ink ejected onto the recording material by said recording head;

heat control means for actuating said heat fusing means in response to a call signal associated with the transmission of image data from the other image communication system; and communication control means for causing said communication means to transmit a predetermined procedure signal to the other image communication system when a temperature of said heat fusing means reaches a predetermined temperature within a predetermined time after actuation thereof, wherein the predetermined procedure signal indicates that the system is ready to receive image data from the other image communication system.

7. An image communication system according to claim 6, wherein said communication control means repeatedly transmits another procedure signal to the other image communication system until said heat fusing means reaches the predetermined temperature.

8. An image communication system according to claim 6, wherein another procedure signal indicates a status of the system to the other image communication system.

9. An image communication system according to claim 6, wherein said communication control means releases a communication line to the other image communication system when the temperature of said heat fusing means does not reach the predetermined temperature within the predetermined time.

10. An image communication system according to claim 9, wherein said communication control means outputs an error alarm when the communication line is released.

11. An image communication system according to any one of claims 6 to 10, wherein said discharge energy generation elements generate heat energy to cause ink to change state and be ejected from orifices.

* * * * *

UNITED STATES PATENT AND TRADEMARK OFFICE
CERTIFICATE OF CORRECTION

PATENT NO. : 5,249,062
DATED : September 28, 1993
INVENTOR(S) : SEISHI EJIRI, ET AL.

Page 1 of 3

It is certified that error appears in the above-indentified patent and that said Letters Patent is hereby corrected as shown below:

IN THE DRAWINGS

SHEET 1 OF 8

FIG. 2, "JC" should read --IJC--.

SHEET 5 OF 8

FIG. 7A, "TRANSMITING" should read --TRANSMITTING-- and "TEMPERATUR" should read --TEMPERATURE--.

FIG. 7B, "TRANSMITING" should read --TRANSMITTING-- and "TEMPERATUR" should read --TEMPERATURE--.

COLUMN 1

Line 39, "rubbed" should read --rub--.

COLUMN 2

Line 21, "an" should read --a--.

COLUMN 5

Line 13, "signal" should read --signal,--.

COLUMN 6

Line 23, "signal" (first occurrence) should read --signal,--.
Line 58, "medium R" should read --medium--.

UNITED STATES PATENT AND TRADEMARK OFFICE
CERTIFICATE OF CORRECTION

PATENT NO. : 5,249,062
DATED : September 28, 1993
INVENTOR(S) : SEISHI EJIRI, ET AL.

It is certified that error appears in the above-indentified patent and that said Letters Patent is hereby corrected as shown below:

COLUMN 7

Line 26, "4,723,629" should read --4,723,129--.
Line 31, "ated" should read --ate--.
Line 35, "action" should read --acting--.

COLUMN 9

Lines 5-23 should read as follows:

--2. An image communication system according to claim 1, wherein the predetermined procedure signal indicates to the other image communication system to begin image data transmission.

3. An image communication system according to claim 1, wherein said communication control means releases a communication line to the other image communication system when the temperature of said heat fusing means does not reach the predetermined temperature within the predetermined time.

4. An image communication system according to claim 3, wherein said communication control means outputs an error alarm when the communication line is released.

5. An image communication system according to any one of claims 1 to 4, wherein said discharge energy generating elements generate heat energy to cause ink to change state and be ejected from orifices.--.

UNITED STATES PATENT AND TRADEMARK OFFICE
CERTIFICATE OF CORRECTION

PATENT NO. : 5,249,062

DATED : September 28, 1993

INVENTOR(S) : SEISHI EJIRI, ET AL.

It is certified that error appears in the above-identified patent and that said Letters Patent is hereby corrected as shown below:

COLUMN 10

Line 20, "claim 6," should read --claim 7,-- and "another" should read --the another--.
Line 35, "generation" should read --generating--.

Signed and Sealed this

Tenth Day of May, 1994

BRUCE LEHMAN

Attest:

Attesting Officer

Commissioner of Patents and Trademarks